United States Patent [19]

Heys, Jr. et al.

[11] Patent Number: 5,153,589

[45] Date of Patent: Oct. 6, 1992

[54] DATA PROCESSING TERMINAL WITH REMOVABLE KEYBOARD MODULE

[75] Inventors: George Heys, Jr.; Andrew E. Yandora; Philip D. McDowell, all of Cambridge, Ohio

[73] Assignee: NCR Corporation, Dayton, Ohio

[21] Appl. No.: 479,225

[22] Filed: Feb. 12, 1990

Related U.S. Application Data

[63] Continuation of Ser. No. 213,080, Jun. 29, 1988, abandoned.

[51] Int. Cl.⁵ .............................................. H05K 5/02
[52] U.S. Cl. .................................... 341/22; 361/390; 361/391
[58] Field of Search .................. 341/22; 361/390, 391, 361/1, 343, 193; 235/145 R, 7 R, 1 D; 200/302.2, 307, 341, 296, 50 A, 61.61, 61.62, 50 R, 50 AA; 364/708; 400/714, 691, 682; 307/326

[56] References Cited

U.S. PATENT DOCUMENTS

| | | | |
|---|---|---|---|
| 3,890,480 | 6/1975 | Berling et al. | 200/302.2 |
| 3,919,507 | 11/1975 | Middleton, Jr. | 361/343 |
| 3,978,297 | 8/1976 | Lynn et al. | 200/5 A |
| 4,060,703 | 11/1977 | Everett, Jr. | 200/5 A |
| 4,084,214 | 4/1978 | Eppich | 235/145 R |
| 4,208,081 | 6/1980 | Kekas et al. | 341/22 |
| 4,323,979 | 4/1982 | Johnston | 364/708 |
| 4,326,193 | 4/1982 | Markley et al. | 340/711 |
| 4,333,155 | 6/1982 | Johnston | 364/708 |
| 4,387,127 | 6/1983 | Ogden | 235/145 R |
| 4,527,250 | 7/1985 | Galdun et al. | 364/900 |
| 4,580,062 | 4/1986 | MacLaughlin | 361/193 |
| 4,671,688 | 6/1987 | Brashears | 400/714 |
| 4,692,740 | 9/1987 | Washizuka et al. | 341/22 |
| 4,719,337 | 1/1988 | Hudson et al. | 235/7 R |
| 4,755,902 | 7/1988 | Takahashi | 361/1 |
| 4,788,658 | 11/1988 | Hanebuth | 364/708 |
| 4,792,650 | 12/1988 | Iwai | 200/50 R |
| 4,798,923 | 1/1989 | Barwick et al. | 200/50 R |

FOREIGN PATENT DOCUMENTS

| | | |
|---|---|---|
| 0013318 | 7/1980 | European Pat. Off. |
| 8336889 | 3/1984 | Fed. Rep. of Germany |
| 2461430 | 1/1981 | France |
| 2589013 | 4/1987 | France ............................ 200/50 A |
| 2149221 | 5/1985 | United Kingdom |

OTHER PUBLICATIONS

U.S. application Ser. No. 181,341, filed Apr. 14, 1988, Donald L. Forsythe, entitled, "Retail Terminal or Similar Article".

U.S. application Ser. No. 212,839, filed Jun. 29, 1988, George Heys, Jr. et al. entitled "Electronic Apparatus Assembly".

U.S. application Ser. No. 213,066, filed Jun. 29, 1988, George Heys, Jr. et al. entitled "Passive Strain Relief Apparatus".

*Primary Examiner*—Donald J. Yusko
*Assistant Examiner*—Michael Horabik
*Attorney, Agent, or Firm*—Albert L. Sessler, Jr.

[57] ABSTRACT

A data processing terminal is provided with a keyboard which can be removed to provide access to the interior of the terminal for maintenance and repair of electrical components contained therein. Removal of the keyboard causes the operating circuit for the terminal to be interrupted, thereby eliminating danger of shock to someone working in the interior of the terminal. Assembly of the keyboard to the remainder of the terminal is accomplished largely by means of molded engaging and latching elements, thereby minimizing the effort required for assembly and disassembly.

2 Claims, 6 Drawing Sheets

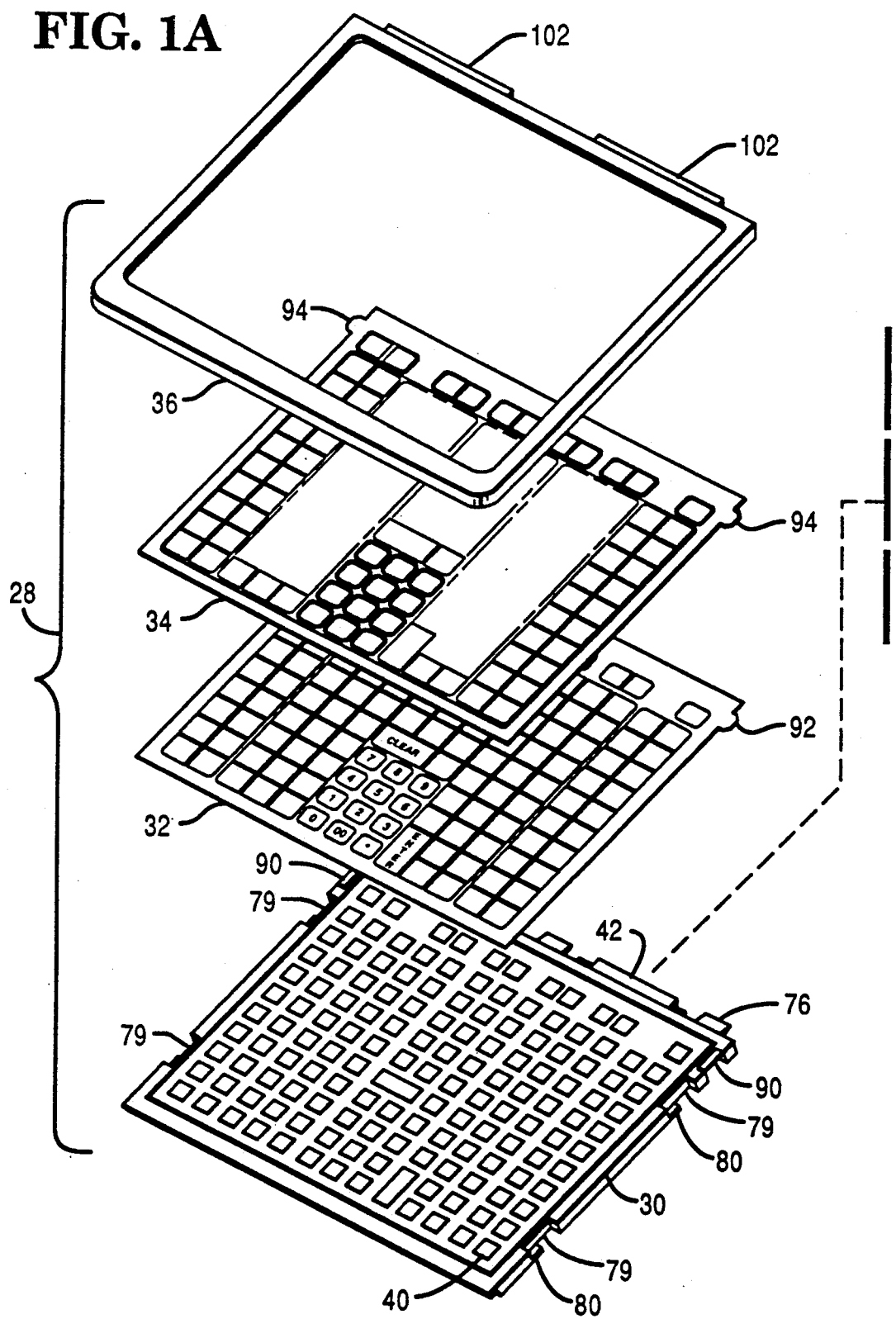

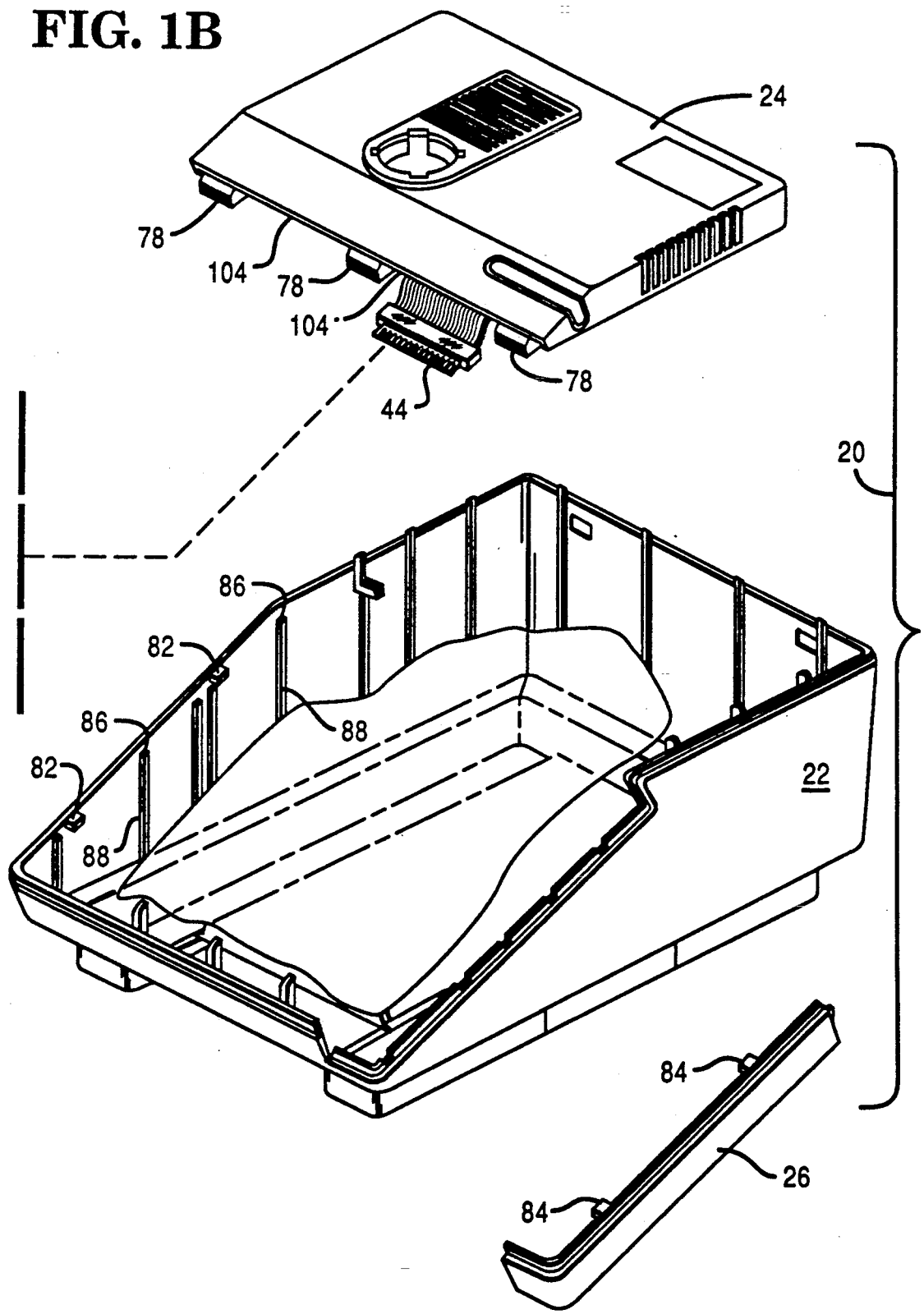

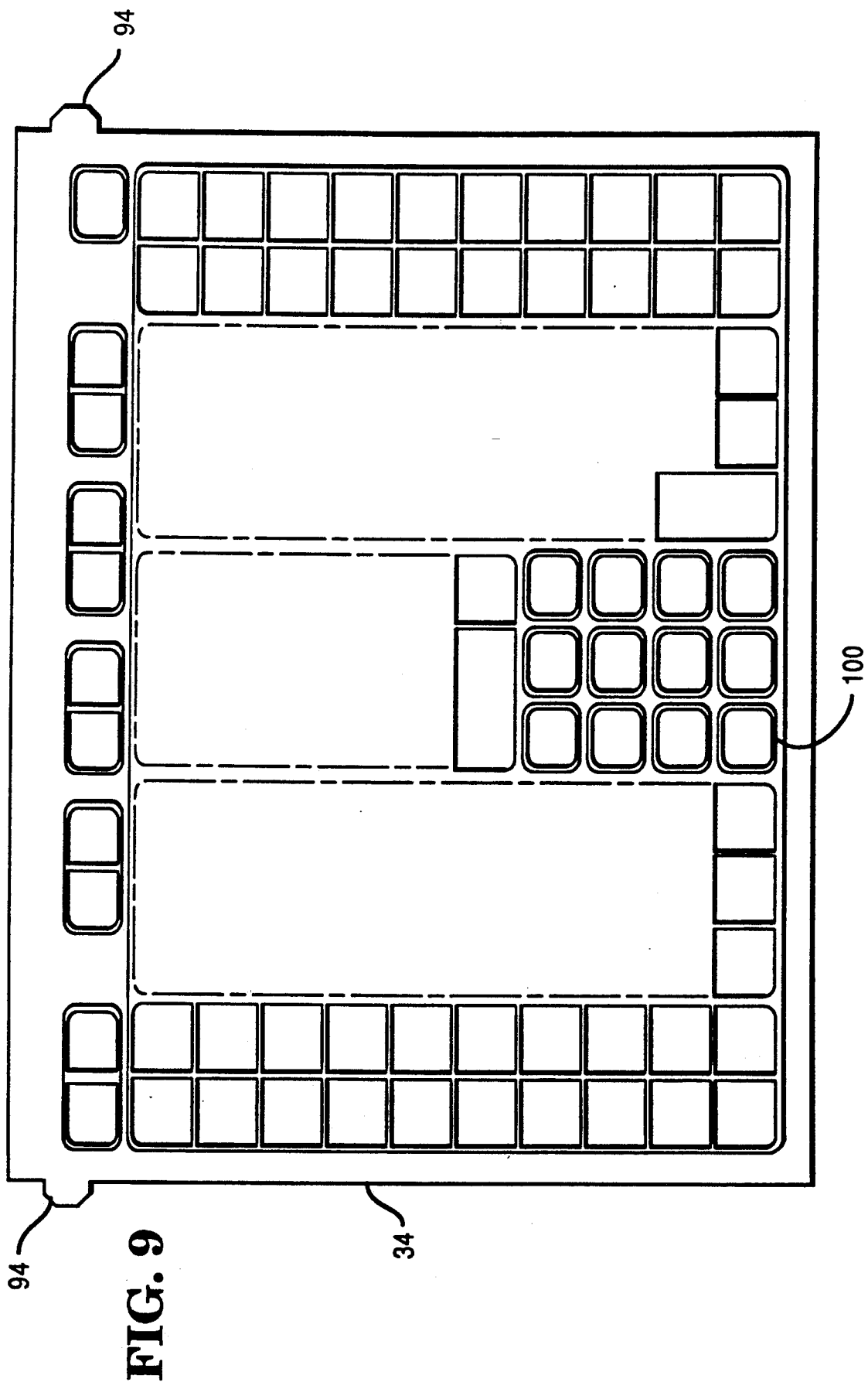

DATA PROCESSING TERMINAL WITH REMOVABLE KEYBOARD MODULE

This is a continuation of co-pending application Ser. No. 213,080 filed on Jun. 29, 1988, abandoned.

CROSS REFERENCE TO RELATED APPLICATIONS

The subject matter of this application is related to the subject matter of the following copending United States patent applications:

Electronic Apparatus Assembly, U.S. Ser. No. 212,839, filed on even date herewith, inventors George Heys, Jr., Andrew E. Yandora and Philip D. McDowell, assigned to NCR Corporation, issued on Jun. 20, 1989, as U.S. Pat. No. 4,841,412; and Passive Strain Relief Apparatus, U.S. Ser. No. 213,066, filed on even date herewith, inventors George Heys, Jr., Andrew E. Yandora and Philip D. McDowell, assigned to NCR Corporation, issued on Mar. 28, 1989, as U.S. Pat. No. 4,816,619.

BACKGROUND OF THE INVENTION

Serviceability by customers is an important consideration in the design of certain data processing terminals. Such serviceability is enhanced by providing for the ready removal of some terminal components, such as the keyboard, and by ready access to the interior of the terminal where the electronic components are normally located. In addition, safety requirements set forth by various organizations such as the Underwriter Laboratories (UL) and the Canadian Standards Association (CSA) must be observed. Safety is enhanced by providing for interruption of operating current for a terminal whenever access to the interior of said terminal is provided by removal of one or more parts of the terminal housing.

SUMMARY OF THE INVENTION

This invention relates to customer serviceable data processing terminals, and more particularly relates to such terminals having a removable keyboard module.

In accordance with a first embodiment of the invention, a keyboard module for an electronic apparatus, said apparatus having a housing which is provided with an access aperture closed by said keyboard module, said housing provided with latching elements for latching said keyboard module in place, and with a first electrical connector for electrical engagement with said keyboard module, said keyboard module comprises: a keyboard assembly including a plurality of individual key elements for the input of data; a second electrical connector rigidly secured to said keyboard assembly and positioned to operatively engage said first electrical connector on said housing as a result of assembly of said keyboard module with said housing; electrical circuit means extending through said first and second electrical connectors to interrupt operating current in the apparatus by separating said first and second electrical connector means whenever the keyboard module is disassembled from the housing; and latching means on said keyboard module cooperable with the latching elements of the housing to retain said keyboard module in assembled relation to said housing, the cooperating latching means on the keyboard module and the housing comprising a slot on each side of said keyboard module having a large upper portion and a reduced lower portion and a projection on each side of said housing adapted to slidably engage in the larger upper portion of said slot to latch said keyboard module in position on said housing after having been moved through said reduced lower portion of said slot.

In accordance with a second embodiment of the invention, a data processing terminal comprises: a housing for the terminal; a keyboard module for the terminal which coacts with the housing to prevent access to the interior of the terminal when assembled in place and which provides an aperture for access to the interior of the terminal when disassembled from the housing; cooperating latching means on the keyboard module and the housing to retain the keyboard module in position on the housing when assembled therewith, the cooperating latching means on the keyboard module and the housing comprising a slot on each side of said keyboard module having a larger upper portion and a reduced lower portion and a projection on each side of said housing adapted to slidably engage in the larger upper portion of said slot to latch said keyboard module in position on said housing after having been moved through said reduced lower portion of said slot; cooperating electrical connector means one of which is rigidly secured to the keyboard module and the other of which is located in the terminal to provide electrical connection between the keyboard module and the remainder of the terminal as a result of assembly of the keyboard module with the terminal; and electrical circuit means extending through said cooperating electrical connector means to interrupt operating current in the terminal by separating said cooperating electrical connector means whenever the keyboard module is disassembled from the housing.

It is accordingly an object of the present invention to provide a readily serviceable data processing terminal having a removable keyboard module.

Another object is to provide a data processing terminal having a removable keyboard module, the removal of which interrupts the operating current for the terminal.

Another object is to provide a keyboard module for an electronic apparatus, which module is readily removable to facilitate servicing and maintenance of electronic components contained within said apparatus.

Another object is to provide a keyboard module for an electronic apparatus, which module is readily removable, the removal of which interrupts the operating current for the apparatus.

With these and other objects, which will become apparent from the following description, in view, the invention includes certain novel features of construction and combinations of parts, a preferred form or embodiment of which is hereinafter described with reference to the drawings which accompany and form a part of this specification.

BRIEF DESCRIPTION OF THE DRAWINGS

FIGS. 1A and 1B, taken together, constitute an exploded perspective view of a keyboard and a terminal housing.

FIG. 9 is a plan view of the transparent overlay.

DESCRIPTION OF THE PREFERRED EMBODIMENT

Figure 2:
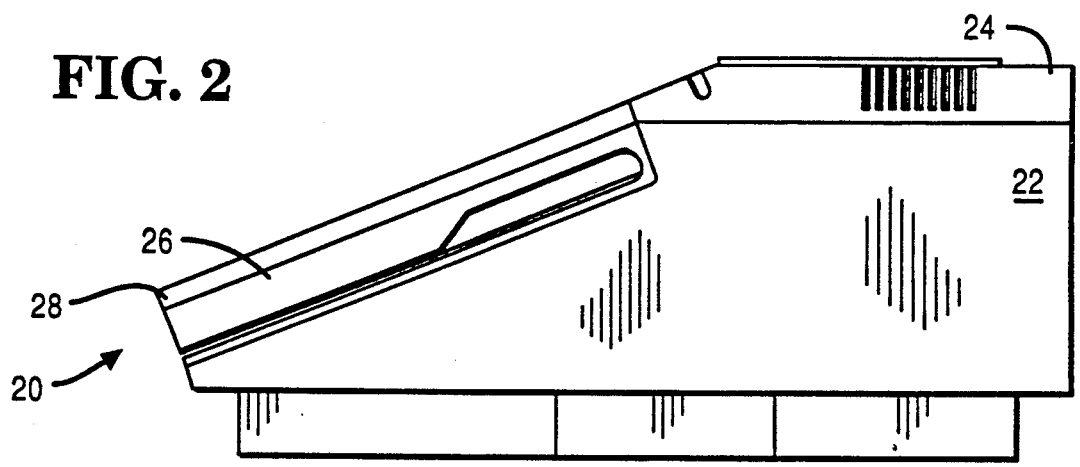
FIG. 2 is an elevation view of the keyboard assembled to the terminal housing.
Figure 3:
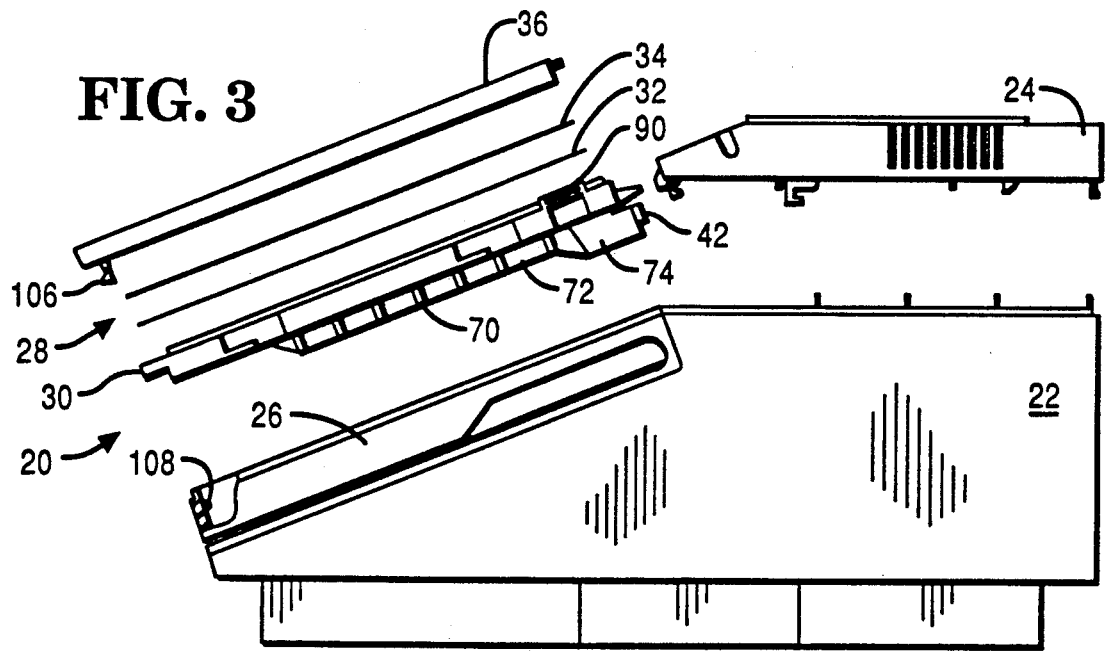
FIG. 3 is an exploded elevation view of the keyboard and the terminal housing.

Referring now to FIGS. 1A and 1B, a terminal housing 20 includes a body 22, a top 24 and a side piece 26 which is removable and replaceable to permit some alterations in the terminal housings to meet differing customer needs with respect to certain components such as magnetic stripe readers. Assembly of the elements 22, 24 and 26 leaves a large aperture at the upper front of the terminal 22, through which access may be had to the interior of the terminal 20 for purposes of maintenance and repair. This aperture is closed when the terminal is in use by a keyboard 28, shown in exploded form in FIG. 1A. The keyboard 28 includes a keyboard module 30, a key caption sheet 32, a transparent overlay 34 and a bezel 36 which frames and retains the sheet 32 and overlay 34 of the keyboard 28.

The keyboard module 30 contains a plurality of touch-activated switch pads 40 arranged in a suitable keyboard configuration. Depression of the switch pads 40 causes switch closure or other appropriate means for the generation of electronic signals which are transmitted to other electronic components placed in the interior of the housing 22 through an electrical connector 42 which operatively engages with a mating connector 44 connected to other electrical components within the terminal 20 when the keyboard 28 is assembled to the remainder of the terminal exterior structure.

Figure 4:
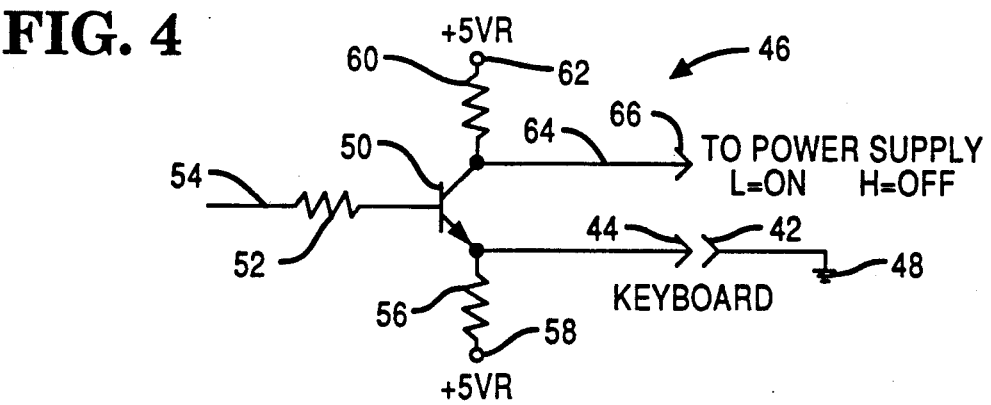
FIG. 4 is a diagram of a circuit for interrupting power to the terminal when the keyboard is removed therefrom.
Figure 5:
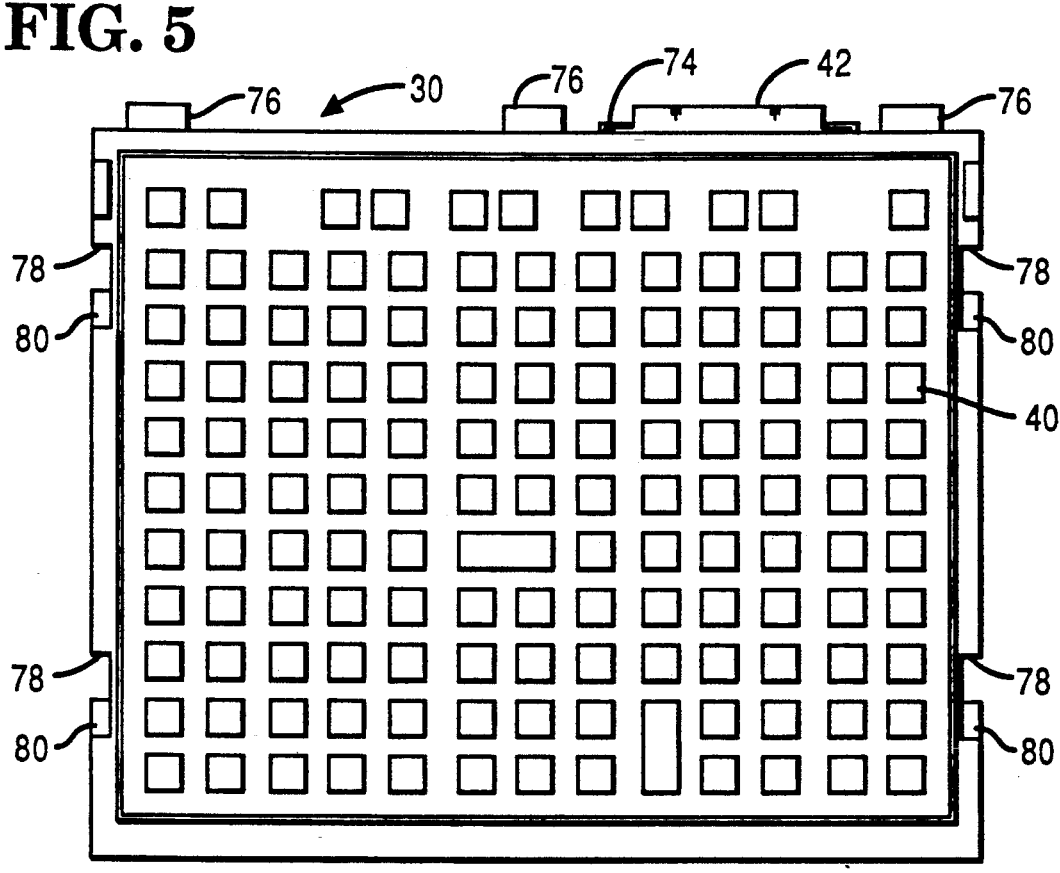
FIG. 5 is a plan view of the keyboard module.
Figure 6:
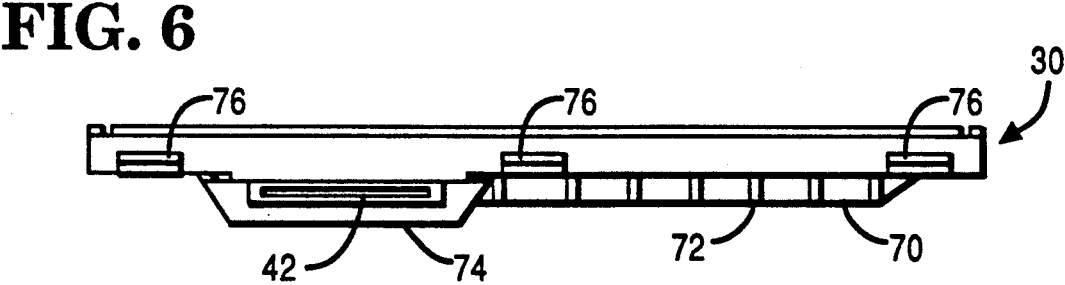
FIG. 6 is a rear view of the keyboard module.
Figure 7:
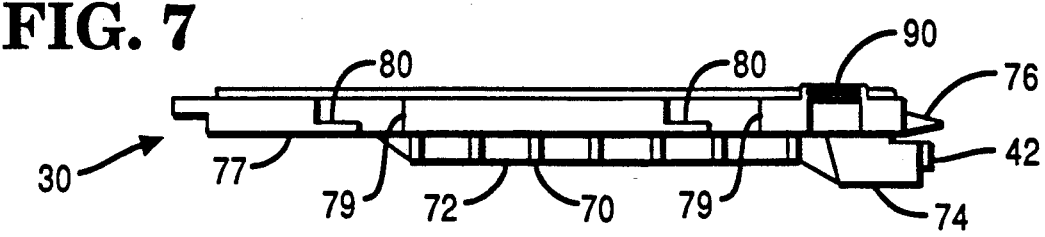
FIG. 7 is an elevation view of the keyboard module.
Figure 8:
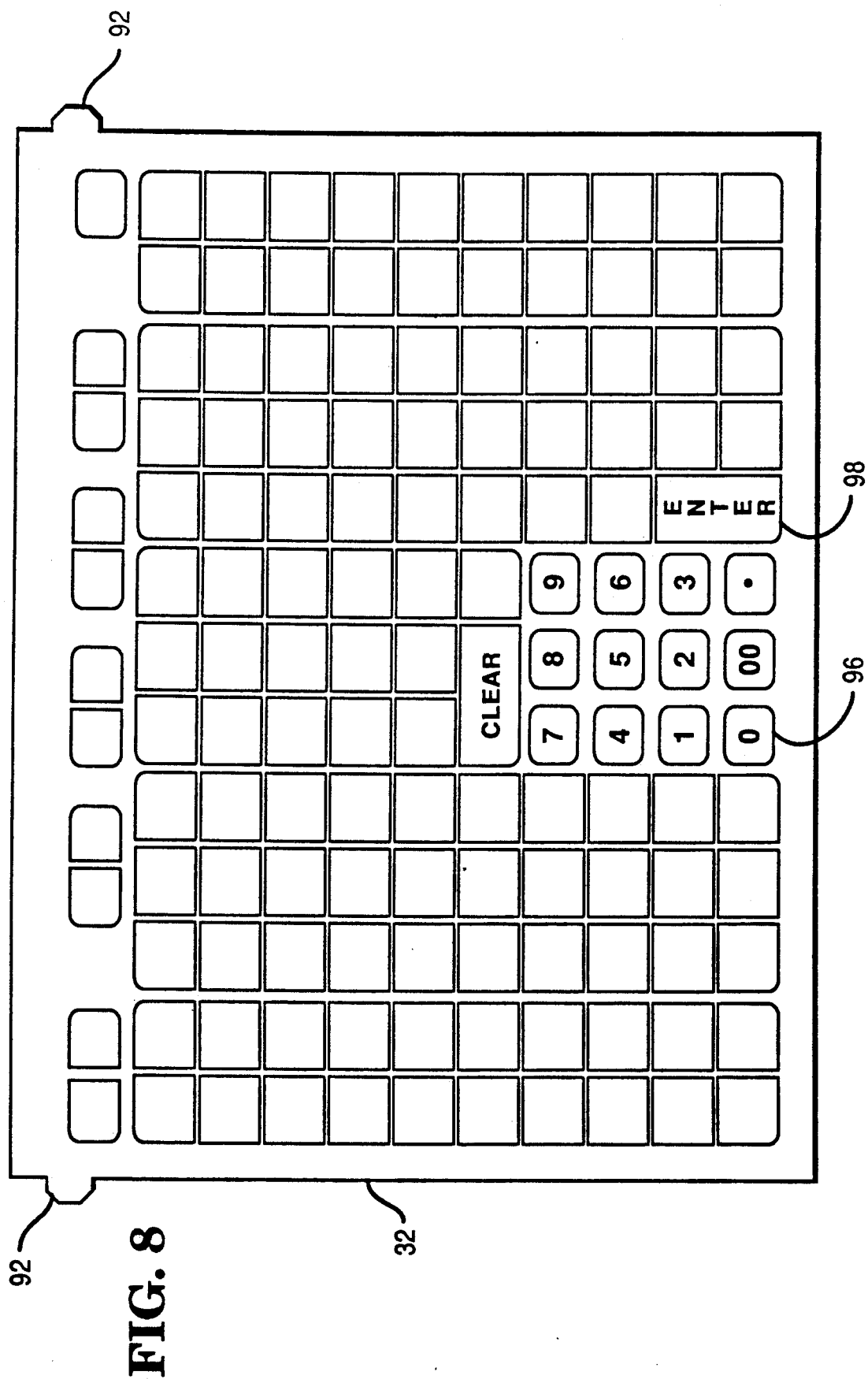
FIG. 8 is a plan view of the key caption sheet.

Included in the circuitry extending through the connectors 42, 44 is the power supply circuit generally designated as 46 shown in FIG. 4. The ground connection 48 for this circuit is located in the keyboard 28. Said circuit extends through the connectors 42, 44. The circuit also includes an NPN transistor 50, the base of which is connected through a resistor 52 to a control conductor 54. The emitter of the transistor 50 is connected through a resistor 56 to a +5-volt regulated source of potential 58, and to the ground connection 48. The collector of the transistor 50 is connected through a resistor 60 to a 5-volt regulated source of potential 62, and is also connected via a conductor 64 through a connector 66 to a power supply (not shown) for the terminal 20. It will be seen that operation of the power supply can be controlled by the operator or by other terminal functions by means of a signal of proper level on the conductor 54. It will further be seen that when the keyboard 28 is removed from the terminal 20, the ground connection through the connectors 42, 44 is broken, and the signal level on the collector of the transistor 50 remains at a high +5-volt level, so that the power supply remains turned off.

Returning to the keyboard module 30, this is provided on the bottom with a matrix of reinforcing bars 70 and 72 at right angles to each other, to improve the rigidity of the module 30. The connector 42 is fixed within a support 74 which is fixed to the horizontal base 77 of the module 30, and to several of the bars 72.

At its upper end, adjacent the connector 42, the module 30 is provided with three tabs or projections 76 which engage complementary slots 78 when the keyboard 28 is assembled with the rest of the terminal 20.

Along each side, the module 30 is provided with two cut-away portions 79. In each portion 79 is provided a projection 80 which extends across part of the bottom opening of the portion 79. The portions 79 and projections 80 coact with inwardly extending tabs 82 molded integrally with the housing 22 on one side of the terminal 20, and with inwardly extending tabs 84 molded integrally with the side piece 26 on the other side of the terminal 20 to assist in retaining the keyboard 28 in position in the terminal 20. In addition, the upper ends 86 of internal ribs 88 engage the bottom of the keyboard module 30 at the edges thereof to assist in such retention.

The keyboard module 30 is also provided at each side toward the upper end with a slot 90 which is adapted to receive tabs 92 of the key caption sheet 32 and tabs 94 of the transparent overlay sheet 34. The cooperating slots 90 and tabs 92, 94 function to hold the key caption sheet 32 and the transparent overlay sheet 34 in proper superimposed relationship to the keyboard module 30.

The key caption sheet 32 is positioned directly over the keyboard module 30, with the tabs 92 in the slots 90. With the sheet 32 so positioned, various indicia bearing portions of the sheet 32, such as areas 96 representing numeric keys of various values, and area 98 representing the "ENTER" key, are located directly over corresponding switch pads 40, so that pressure applied by the finger of a human operator on such area on the sheet 32 causes operation of the corresponding switch pad in the keyboard module 30.

The transparent overlay sheet 34 is positioned directly over the key caption sheet 32, with the tabs 94 in the slots 90 directly over the tabs 92 of the caption sheet 32. With the sheet 34 so positioned, the sheet 34 provides a transparent protective cover over the sheet 32. Areas of the sheet 34, such as the area 100, are defined by lines molded into said sheet, and correspond to the key areas such as 96 and 98 on the sheet 32.

When the keyboard 28 is to be assembled to the remainder of the housing structure of the terminal 20, the keyboard module 30 is moved into operative relationship with the opening in the housing of the terminal 20, so that the cut-away portions 79 on both sides of the module 30 receive the tabs 82 and 84 on the housing 22 and the side piece 26, respectively. The module 30 is then shifted toward the top 24. This causes the projections 80 to move beneath the tabs 82, 84, and causes the tabs 76 to move into engagement with the slots 78 on the top 24. In addition, the connector 42 on the module 30 mates with the connector 44 within the terminal 20 and establishes electrical connection between the module 30 and the remainder of the terminal. The sheets 32 and 34 are then superimposed on the module 30 and the tabs 92 and 94 of said sheets are positioned in the slots 90 of the module 30.

After the assembly of the module 30 and the sheets 32 and 34 is in position, the bezel 36 is added in order to close the gaps present between the assembly and the surrounding upper edges of the housing 22, the top 24 and the side piece 26. Projections 102 of the bezel 36 are located in openings 104 in the top 24, and the bezel 36 is rotated downwardly until integral plastic latches 106 on the underside of the lower end of the bezel engage with retainers 108 on the inside surface of the front end of the housing 22 of the terminal 20, to lock the bezel 36 in place.

With the keyboard 28 fixed in position, the access aperture to the interior of the terminal 20 is closed, and the various elements of the exterior provide a secure housing with no access to the interior. Also the power supply circuit is completed, thus enabling the terminal 20 to function. When the keyboard 26 is removed, in order to provide access to the terminal interior for repair or maintenance, or for some other reason, the bezel 36 is first removed by prying up its lower or front edge against the flexible engagement of the latch 106 with the retainer 108, and then shifting the bezel so that the tabs 102 are moved out of engagement with the openings 104. With the bezel removed, the sheets 32, 34 can be taken off the keyboard module 30, and said module can be shifted so that the connectors 42, 44 are separated and the tabs 76 move out of engagement with the slots 78. The projections 80 move out from under the tabs 82, 84, and the keyboard module can be lifted away from the remainder of the housing of the terminal 20 to provide access to the interior thereof.

While the form of the invention illustrated and described herein is particularly adapted to fulfill the objects aforesaid, it is to be understood that other and further modifications within the scope of the appended claims may be made without departing from the spirit of the invention.

What is claimed is:

1. A keyboard module for an electronic apparatus, said apparatus having a housing which is provided with an access aperture closed by said keyboard module, said housing provided with latching elements for latching said keyboard module in place, and with a first electrical connector for electrical engagement with said keyboard module, said keyboard module comprising:
   a keyboard assembly including a plurality of individual key elements for the input of data;
   a second electrical connector rigidly secured to said keyboard assembly and positioned to operatively engage said first electrical connector on said housing as a result of assembly of said keyboard module with said housing;
   electrical circuit means extending through said first and second electrical connectors to interrupt operating current in the apparatus by separating said first and second electrical connector means whenever the keyboard module is disassembled from the housing; and
   latching means on said keyboard module cooperable with the latching elements of the housing to retain said keyboard module in assembled relation to said housing, the cooperating latching means on the keyboard module and the housing comprising a slot on each side of said keyboard module having a large upper portion and a reduced lower portion and a projection on each side of said housing adapted to slidably engage in the larger upper portion of said slot to latch said keyboard module in position on said housing after having been moved through said reduced lower portion of said slot.

2. A data processing terminal, comprising
   a housing for the terminal;
   a keyboard module for the terminal which coacts with the housing to prevent access to the interior of the terminal when assembled in place and which provides an aperture for access to the interior of the terminal when disassembled from the housing;
   cooperating latching means on the keyboard module and the housing to retain the keyboard module in position on the housing when assembled therewith, the cooperating latching means on the keyboard module and the housing comprising a slot on each side of said keyboard module having a larger upper portion and a reduced lower portion and a projection on each side of said housing adapted to slidably engage in the larger upper portion of said slot to latch said keyboard module in position on said housing after having been moved through said reduced lower portion of said slot;
   cooperating electrical connector means one of which is rigidly secured to the keyboard module and the other of which is located in the terminal to provide electrical connection between the keyboard module and the remainder of the terminal as a result of assembly of the keyboard module with the terminal; and
   electrical circuit means extending through said cooperating electrical connector means to interrupt operating current in the terminal by separating said cooperating electrical connector means whenever the keyboard module is disassembled from the housing.

* * * * *